United States Patent
Bui et al.

(10) Patent No.: US 11,438,480 B2
(45) Date of Patent: Sep. 6, 2022

(54) IMAGE READING DEVICE AND IMAGE FORMING DEVICE COMPRISING A DRIVE DEVICE CONFIGURED TO SELECTIVELY APPLY A DRIVING FORCE TO THE CARRIAGE AND THE PLUTALITY OF PAIRS OF CONVEYANCE ROLLERS, WHEREIN THE DEVICE DRIVER INCLUDES AN ABUTTING MEMBER, A MOTOR, A CARRIAGE THAT ROTATES IN CONJUNCTION WITH THE MOTOR SUPPORTS A FIRST MAIN BODY GEAR TO MESH WITH A COVER INPUT GEAR AND A SECOND MAIN BODY GEAR TO MESH WITH A MAIN RACK GEAR

(71) Applicant: KYOCERA Document Solutions Inc., Osaka (JP)

(72) Inventors: Khac Thap Bui, Osaka (JP); Danh Hoang Nguyen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/295,838

(22) PCT Filed: Nov. 7, 2019

(86) PCT No.: PCT/JP2019/043580
§ 371 (c)(1),
(2) Date: May 20, 2021

(87) PCT Pub. No.: WO2020/105440
PCT Pub. Date: May 28, 2020

(65) Prior Publication Data
US 2022/0014643 A1 Jan. 13, 2022

(30) Foreign Application Priority Data
Nov. 21, 2018 (JP) .............................. JP2018-218495

(51) Int. Cl.
*H04N 1/10* (2006.01)
*H04N 1/024* (2006.01)
(Continued)

(52) U.S. Cl.
CPC ......... *H04N 1/1035* (2013.01); *H04N 1/0249* (2013.01); *H04N 1/02835* (2013.01); *H04N 1/1061* (2013.01); *H04N 1/1215* (2013.01)

(58) Field of Classification Search
CPC ............. H04N 1/00602; H04N 1/0249; H04N 1/02835; H04N 1/1035; H04N 1/1061;
(Continued)

(56) References Cited

U.S. PATENT DOCUMENTS 8,982,436 B2 * 3/2015 Washizawa .............. H04N 1/12
358/529
9,225,869 B2 * 12/2015 Miyamoto ............. H04N 1/121
(Continued)

FOREIGN PATENT DOCUMENTS

JP 2006086817 A 3/2006
JP 2014033390 A * 2/2014

*Primary Examiner* — Chad Dickerson
(74) *Attorney, Agent, or Firm* — Alleman Hall Creasman & Tuttle LLP

(57) ABSTRACT

One motor is shared for carriage movement and document sheet conveyance. An abutting member stops the carriage, that has moved from a second position located below a first end portion of a platen glass, at a first position located below a contact glass. The carriage supports the motor and first and second main body gears. The main body gears interlock with the motor. A cover input gear meshes with the first main body gear when the carriage is located between the first position and a relay region. A main rack gear meshes with the second main body gear when the carriage is located in a region extending from the relay region to a third position located below a second end portion of the platen glass. A
(Continued)

load torque applied to the motor is larger when the carriage is fixed than when the cover input gear is fixed.

4 Claims, 4 Drawing Sheets

(51) Int. Cl.
*H04N 1/028* (2006.01)
*H04N 1/12* (2006.01)
*H04N 1/00* (2006.01)

(58) Field of Classification Search
CPC .......... H04N 1/1215; H04N 1/04; B65H 5/06; G03B 27/62; G03B 27/50; G03G 15/00
USPC ................................ 358/1.11–1.18, 474, 498
See application file for complete search history.

(56) References Cited

U.S. PATENT DOCUMENTS

| | | | |
|---|---|---|---|
| 2014/0092453 A1* | 4/2014 | Ishikawa .............. | G03G 15/602 |
| | | | 358/498 |
| 2016/0060057 A1* | 3/2016 | Nobuta .................. | B65H 29/58 |
| | | | 74/405 |

* cited by examiner

IMAGE READING DEVICE AND IMAGE FORMING DEVICE COMPRISING A DRIVE DEVICE CONFIGURED TO SELECTIVELY APPLY A DRIVING FORCE TO THE CARRIAGE AND THE PLUTALITY OF PAIRS OF CONVEYANCE ROLLERS, WHEREIN THE DEVICE DRIVER INCLUDES AN ABUTTING MEMBER, A MOTOR, A CARRIAGE THAT ROTATES IN CONJUNCTION WITH THE MOTOR SUPPORTS A FIRST MAIN BODY GEAR TO MESH WITH A COVER INPUT GEAR AND A SECOND MAIN BODY GEAR TO MESH WITH A MAIN RACK GEAR

TECHNICAL FIELD

The present invention relates to an image reading device having functions to convey a document sheet and move a carriage, and relates to an image forming apparatus provided therewith.

BACKGROUND ART

An image forming apparatus such as a copier, a facsimile apparatus, or a multifunction peripheral includes an image reading device and a print device. The image reading device may selectively execute an image reading process of a flatbed method and an image reading process of a document sheet feed method.

In the image reading process of the flatbed method, an image is read from a document sheet placed on a platen glass. In the image reading process of the flatbed method, a carriage moving device causes a carriage to move below the platen glass. On the other hand, in the image reading process of the document sheet feed method, an image is read from a document sheet conveyed by an ADF (Automatic Document Feeder).

The carriage moving device and the ADF need not operate at the same time. As a result, the carriage moving device and the ADF may share one motor.

For example, there is known an image forming apparatus having a mechanism that includes two planetary gears such that one motor is shared by the carriage moving device and the ADF (see, for example, PTL 1).

Specifically, the image reading device causes a first planetary gear that meshes with a sun gear driven by the motor, to reciprocatingly move between a position to transmit a motive power to the ADF and a position to transmit a motive power to the carriage.

Furthermore, in the image reading device, a switching mechanism that includes a second planetary gear and a fixing lever, restricts the movement of the carriage when the ADF operates.

CITATION LIST

Patent Literature

[PTL 1] Japanese Patent Application Publication No. 2006-86817

SUMMARY OF THE INVENTION

Problems to be Solved by the Invention

Meanwhile, in the image reading device, it is desirable that, with as simple configuration as possible, one motor is shared for movement of the carriage and for conveyance of the document sheet.

The present invention has been made in view of such conventional circumstances, and it is an object of the present invention to provide an image reading device in which, with a simple configuration, one motor is shared for movement of a carriage and for conveyance of a document sheet, and to provide an image forming apparatus provided therewith.

Solution to the Problems

An image reading device according to an aspect of the present invention includes an image sensor, a contact glass, a platen glass, a carriage, a main body portion, a cover, a plurality of pairs of conveyance rollers, and a drive device. The platen glass is disposed side by side with the contact glass. The carriage supports a light emission portion that emits light upward, and a light guide member that guides a reflection light of the light emitted from the light emission portion to the image sensor. The carriage, upon application of a driving force, moves along a predetermined moving path that passes through a first position located below the contact glass, a second position located below a first end portion of the platen glass, and a third position located below a second end portion of the platen glass, the first end portion being close to the contact glass, the second end portion being opposite to the first end portion. The main body portion stores the carriage, wherein the contact glass and the platen glass are disposed on an upper surface of the main body portion. The cover is supported in such a way as to be displaced between a closing position and an opening position, the closing position being located on the upper surface of the main body portion where the cover covers the contact glass and the platen glass, the opening position being more separated from the upper surface of the main body portion than the closing position. The plurality of pairs of conveyance rollers are provided in the cover and configured to, upon application of a driving force, convey a document sheet along a conveyance path that passes through positions along an upper surface of the contact glass, in a state where the cover is located at the closing position. The drive device is configured to selectively apply a driving force to the carriage and the plurality of pairs of conveyance rollers. The drive device includes an abutting member, a motor, a first main body gear and a second main body gear, a cover input gear, a cover output gear, and a main rack gear. The abutting member is provided in the main body portion and configured to abut on the carriage that is moving from the second position side to the first position side, thereby stopping the carriage at the first position. The motor is supported by the carriage. The first main body gear and the second main body gear are supported by the carriage, and respectively rotate in conjunction with the motor. The cover input gear is provided in the cover and configured to mesh with the first main body gear in a state where the carriage is located at a position between the first position and a predetermined relay region that is located between the first position and the second position. The cover output gear is configured to cause the plurality of pairs of conveyance rollers to rotate in conjunction with the cover input gear. The main rack gear that is a rack gear disposed in the main body portion in parallel to the moving path, and configured to mesh with the second main body gear in a state where the carriage is located in a region extending from the relay region to the third position. In a state where the carriage is located at a position on the first position side with respect to the relay region, a load torque that is applied to the motor to drive the cover input gear when the carriage is fixed, is larger than a load torque that is applied to the motor to move the carriage when the cover input gear that meshes with the first main body gear, is fixed.

An image forming apparatus according to another aspect of the present invention includes the image reading device and a print device. The print device forms, on a sheet, an image that is read from a document sheet by the image reading device.

Advantageous Effects of the Invention

According to the present invention, it is possible to provide an image reading device in which, with a simple configuration, one motor is shared for movement of a carriage and for conveyance of a document sheet, and to provide an image forming apparatus provided therewith.

DESCRIPTION OF EMBODIMENTS

The following describes embodiments of the present invention with reference to the accompanying drawings. It should be noted that the following embodiments are examples of specific embodiments of the present invention and should not limit the technical scope of the present invention.

First Embodiment

Figure 1:
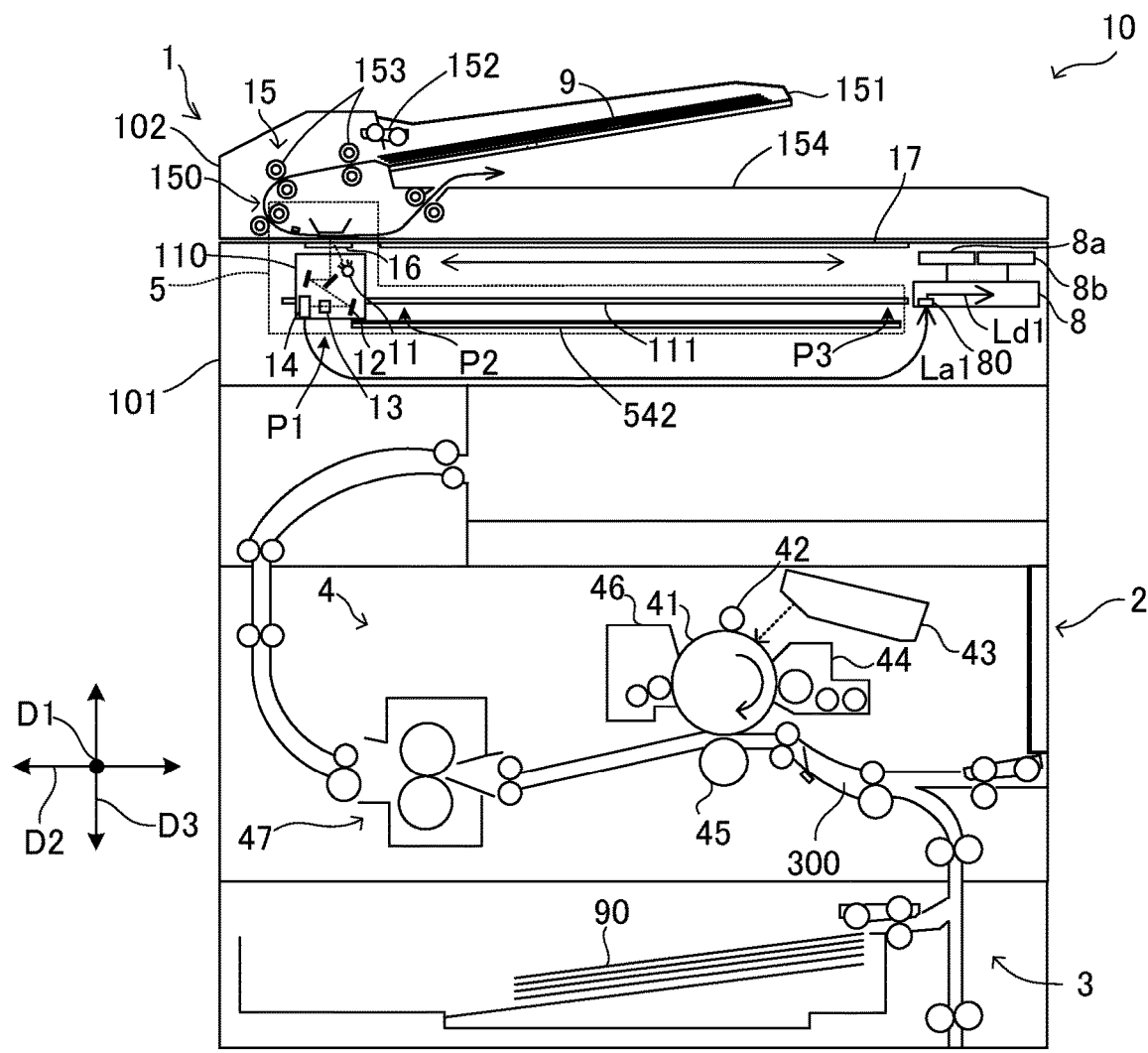
FIG. 1 is a configuration diagram of an image forming apparatus provides with an image reading device according to a first embodiment.

An image reading device 1 according to a first embodiment of the present invention sequentially reads a plurality of line images from a document sheet 9, and sequentially outputs a plurality of pieces of line image data Ld1 that represent the plurality of read line images (see FIG. 1).

In the present embodiment, the image reading device 1 is provided as a part of an image forming apparatus 10 (see FIG. 1).

[Configuration of Image Forming Apparatus 10]

As shown in FIG. 1, the image forming apparatus 10 includes the image reading device 1 and a print device 2. The image forming apparatus 10 further includes an operation device 8a, a display device 8b, and a control device 8.

The operation device 8a, the display device 8b, and the control device 8 are a part of the image reading device 1, and also as a part of the print device 2.

The print device 2 executes a print process to form an image on a sheet 90. For example, the print device 2 executes the print process based on the line image data Ld1 obtained by the image reading device 1. That is, the print device 2 is configured to perform a process to form an image that is read from the document sheet 9 by the image reading device 1, on the sheet 90.

The print device 2 includes a sheet conveying device 3 and an image forming portion 4. The sheet conveying device 3 conveys the sheet 90 along a sheet conveyance path 300. The image forming portion 4 executes the print process on the sheet 90 conveyed by the sheet conveying device 3.

In the example shown in FIG. 1, the image forming portion 4 executes the print process by the electrophotographic method. In the image forming portion, a charging device 42 electrically charges the surface of a drum-like photoconductor 41, and a laser scanning unit 43 writes an electrostatic latent image on the surface of the photoconductor 41.

Furthermore, a developing device 44 develops the electrostatic latent image as a toner image, a transfer device 45 transfers the toner image to the sheet 90, and the fixing device 47 fixes the toner image to the sheet 90. In addition, a drum cleaning device 46 removes residual toner from the surface of the photoconductor 41. It is noted that a device that executes the print process by another method such as the inkjet method, may be adopted as the print device 2.

The image reading device 1 includes a main body portion 101, a cover 102, a light emission portion 11, a plurality of mirrors 12, a lens 13, an image sensor 14, a carriage 110, a guide rail 111, an ADF 15, a contact glass 16, a platen glass 17, a drive device 5, and a carriage sensor 6. The ADF 15 is an example of a document sheet conveying device.

The contact glass 16, the carriage 110, the light emission portion 11, the plurality of mirrors 12, the lens 13, and the image sensor 14 are formed to extend in a main scanning direction D1.

The longitudinal direction of the contact glass 16, the carriage 110, the light emission portion 11, the plurality of mirrors 12, the lens 13, and the image sensor 14 is the main scanning direction D1.

The platen glass 17 is a rectangular sheet of glass extending in the main scanning direction D1 and a sub scanning direction D2. The sub scanning direction D2 is a direction perpendicular to the main scanning direction D1.

In FIG. 1 to FIG. 6, a direction toward the depth direction of the paper surface is the main scanning direction D1, and a direction toward the right and left of the paper surface is the sub scanning direction D2. It is noted that a direction perpendicular to the main scanning direction D1 and the sub scanning direction D2 is a height direction D3.

The main body portion 101 is a housing storing the carriage 110 and the guide rail 111. The contact glass 16 and the platen glass 17 are disposed side by side in the sub scanning direction D2 on an upper surface of the main body portion 101.

The carriage 110 supports the light emission portion 11, the plurality of mirrors 12, the lens 13, and the image sensor 14. The guide rail 111 supports the carriage 110 below the contact glass 16 and the platen glass 17 such that the carriage 110 can move along the sub scanning direction D2.

It is noted that the carriage 110 may include a first carriage and a second carriage, the first carriage supporting the light emission portion 11 and a part of the plurality of mirrors 12, the second carriage supporting the remaining parts of the plurality of mirrors 12. In this case, the lens 13 and the image sensor 14 are fixed inside the main body portion 101.

The second carriage interlocks with the first carriage and moves along the sub scanning direction D2 at a speed half the moving speed of the first carriage.

The light emission portion 11 emits light upward. For example, the light emission portion 11 is an LED array that includes a plurality of LEDs arranged along the main scanning direction D1.

In addition, the light emission portion 11 may include an LED light source and a light guide body that is formed to extend along the main scanning direction D1. In this case, the light guide body guides, along the main scanning direction D1, the light emitted from the LED light source and emits the light upward.

The plurality of mirrors 12 and the lens 13 guide a reflection light of the light emitted from the light emission portion 11, to the image sensor 14. The plurality of mirrors 12 and the lens 13 are an example of a light guide member.

The carriage 110 is configured to, upon receiving a driving force from the drive device 5, move along a predetermined moving path. That is, the guide rail 111 guides the carriage 110 along the moving path. The moving path is a path that passes through a first position P1, a second position P2, and a third position P3. The moving path is a path along the sub scanning direction D2.

The first position P1 is a position below the contact glass 16. The second position P2 is a position below a first end portion, close to the contact glass 16, of the platen glass 17. The third position P3 is a position below a second end portion of the platen glass 17, the second end portion being opposite to the first end portion.

The carriage sensor 6 is a sensor that detects the carriage 110 located at the second position P2. The carriage 110 includes a detected portion 110a that is detected by the carriage sensor 6 (see FIG. 2 to FIG. 4). When the detected portion 110a is located at a position to face the carriage sensor 6, the carriage sensor 6 detects the detected portion 110a.

For example, the carriage sensor 6 may be a reflection-type light sensor that is fixed to a position in the main body portion 101 that corresponds to the second position P2. In this case, the detected portion 110a is a mirror that reflects the light emitted from the reflection-type light sensor.

In addition, the carriage sensor 6 may be a contact-type sensor such as a limit switch. In this case, the detected portion 110a is a projection portion formed on the surface of the carriage sensor 6.

The control device 8 identifies the position of the carriage 110 based on the rotation direction and the number of rotations of a motor 51 that is counted from a point in time when the carriage sensor 6 changes from a state of detecting the carriage 110 to a state of not detecting.

The light emitted from the light emission portion 11 irradiates the document sheet 9, and the plurality of mirrors 12 and the lens 13 guides a reflection light from the document sheet 9 to a light reception portion of the image sensor 14. At this time, the lens 13 converges the reflection light onto the light reception portion of the image sensor 14.

The image sensor 14 receives the reflection light and detects an amount of light of the reflection light. Furthermore, the image sensor 14 outputs a line image signal La1 that represents the detection result of the amount of light of the reflection light.

In the example shown in FIG. 1, the image sensor 14 is a CCD (Charge Coupled Device) type sensor. It is noted that a CIS (Contact Image Sensor) in which a C-MOS type image sensor and a lens are unitized, may be adopted. In this case, the carriage 110 supports the CIS.

The cover 102 is supported in such a way as to be displaced between a closing position and an opening position, wherein the closing position is located on the upper surface of the main body portion 101, and the opening position is more separated from the upper surface of the main body portion 101 than the closing position. At the closing position, the cover 102 covers the contact glass 16 and the platen glass 17 from above.

The cover 102 is coupled with the main body portion 101 by a hinge (not shown). The hinge supports the cover 102 such that the cover 102 can pivot between the closing position and the opening position.

The ADF 15 is built in the cover 102. When the cover 102 is located at the closing position, namely, when the cover 102 is in the state of covering the contact glass 16 from above, the ADF 15 operates.

As shown in FIG. 1, the ADF 15 includes a document sheet conveyance path 150, a supply tray 151, a document sheet pickup device 152, a plurality of pairs of conveyance rollers 153, and a discharge tray 154.

The document sheet conveyance path 150 is a conveyance path of the document sheet 9 and is formed to extend along a curved path that passes through positions along the upper surface of the contact glass 16 to reach an exit that faces the discharge tray 154.

The plurality of pairs of conveyance rollers 153, upon application of a driving force from the drive device 5, convey the document sheet 9 along the document sheet conveyance path 150 in the state where the cover 102 is located at the closing position. The plurality of pairs of conveyance rollers 153 convey the document sheet 9 from an entry side to an exit side of the document sheet conveyance path 150 by rotating in a predetermined forward rotation direction.

The image reading device 1 selectively executes the image reading process of the flatbed method and the image reading process of the document sheet feed method. The drive device 5 selectively applies a driving force to the carriage 110 and the plurality of pairs of conveyance rollers 153.

In the image reading process of the flatbed method, an image is read from the document sheet 9 placed on the platen glass 17. In the image reading process of the flatbed method, the drive device 5 causes the carriage 110 to move reciprocatingly between the second position P2 and the third position P3.

The light emitted by the light emission portion 11 is scanned on the document sheet 9 on the platen glass 17 as the carriage 110 moves. Furthermore, the image sensor 14 sequentially receives reflection light reflected on the document sheet 9 at different positions in the sub scanning direction D2.

On the other hand, in the image reading process of the document sheet feed method, the drive device 5 causes the carriage 110 to move to the first position P1 and stop there, and further causes the plurality of pairs of conveyance rollers 153 to rotate.

When the carriage 110 is located at the first position P1, the light emission portion 11 emits light toward the document sheet 9 across the contact glass 16.

As the document sheet 9 is conveyed along the document sheet conveyance path 150, the light emitted by the light emission portion 11 is scanned on the document sheet 9 that passes the upper surface of the contact glass 16.

The image sensor 14 receives the reflection light reflected on the document sheet 9 when the document sheet 9 is passing the upper surface of the contact glass 16. Upon receiving the light, the image sensor 14 outputs the line image signal La1 that represents the detected amount of light of the reflection light reflected on the document sheet 9. At this time, the image sensor 14 sequentially outputs the line image signals La1 that correspond to the reflection lights reflected on the document sheet 9 at different regions in the sub scanning direction D2.

The operation device 8a is a device for receiving user operations and includes, for example, operation buttons and a touch panel. The display device 8b is a device for displaying information and includes, for example, a panel display device such as a liquid crystal display unit.

The control device 8 performs various types of data processing, controls the image reading device 1, and controls the print device 2. For example, the control device 8 controls the drive device 5. The control device 8 includes an AFE (Analog Front End) 80 that converts the analog line image signal La1 to a digital line image data Ld1.

Meanwhile, in the image reading device 1, it is desirable that, with as simple configuration as possible, one motor is shared for movement of the carriage 110 and for conveyance of the document sheet 9.

The drive device 5 is configured such that, with a simple configuration, one motor is shared for movement of the carriage 110 and for conveyance of the document sheet 9.

[Drive Device 5]

Figure 2:
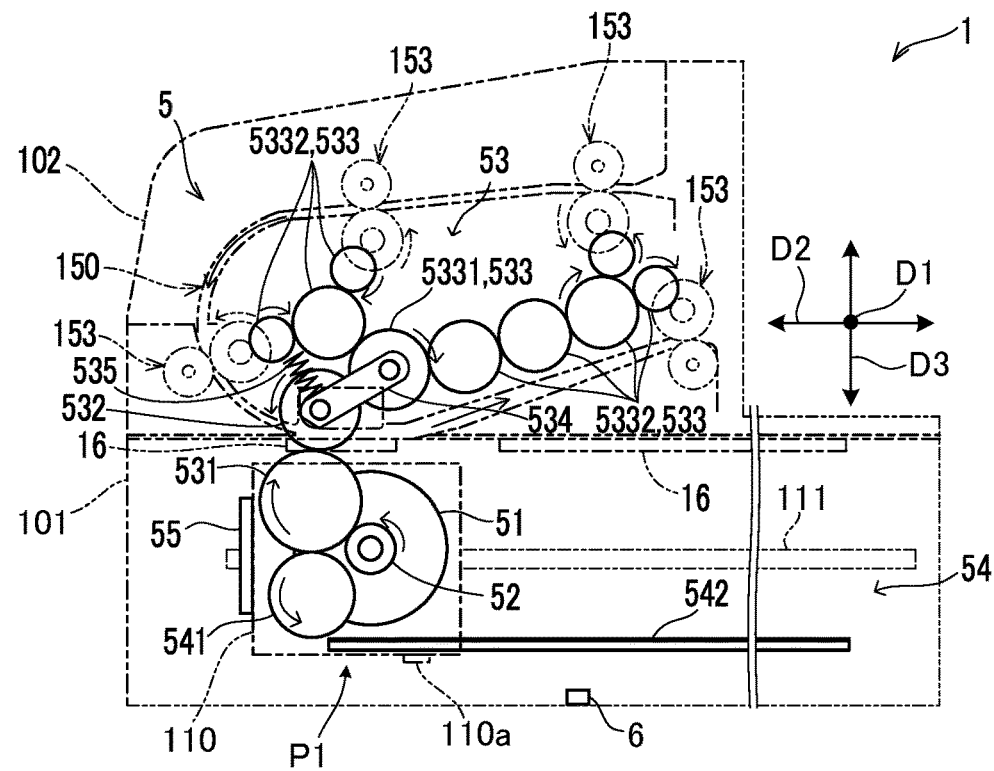
FIG. 2 is a front diagram of a drive device in a state where a carriage is located at a first position in the image reading device according to the first embodiment.
Figure 3:
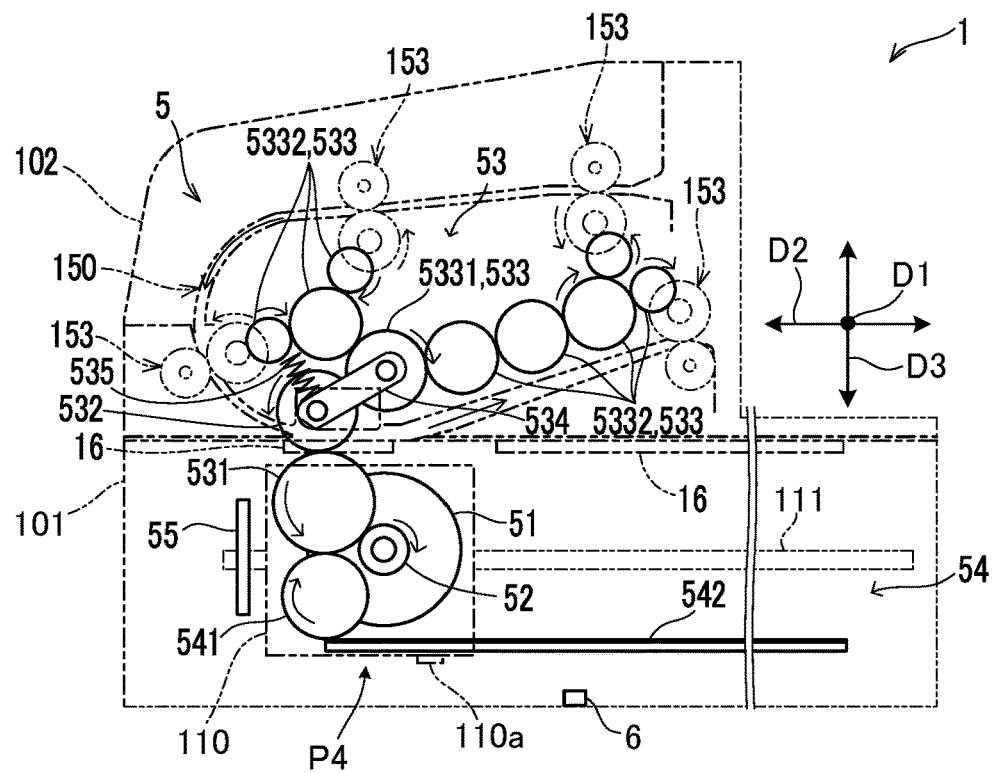
FIG. 3 is a front diagram of the drive device in a state where the carriage is located in a relay region in the image reading device according to the first embodiment.
Figure 4:
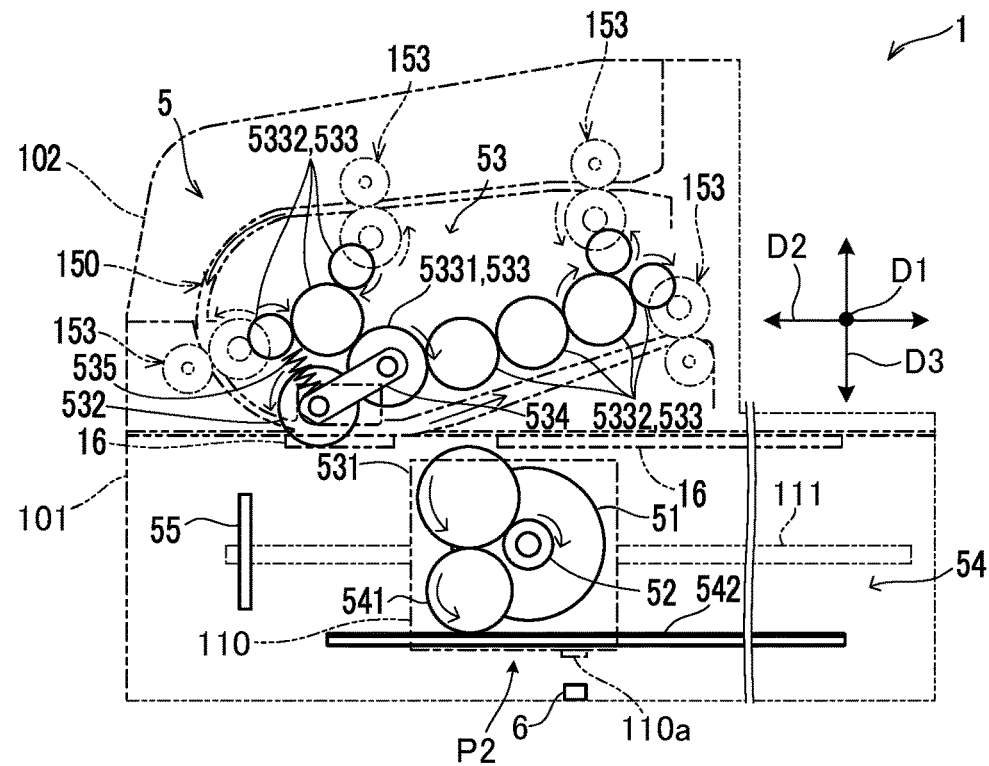
FIG. 4 is a front diagram of the drive device in a state where the carriage is located at a second position in the image reading device according to the first embodiment.

The following describes, with reference to FIG. 2 to FIG. 4, the configuration of the drive device 5. It is noted that in FIG. 2 to FIG. 4, components other than the drive device 5, such as the carriage 110, the main body portion 101, the cover 102, and the plurality of pairs of conveyance rollers 153, are indicated by an imaginary line (a two-dot chain line).

The drive device 5 includes a motor 51, a motor gear 52, a first output mechanism 53, a second output mechanism 54, and an abutting member 55.

The motor 51, a part of the first output mechanism 53, and a part of the second output mechanism 54 are supported by the carriage 110. The remaining part of the first output mechanism 53 is provided in the cover 102. The abutting member 55 and the remaining part of the second output mechanism 54 is provided in the main body portion 101. The motor gear 52 is fixed to a rotary shaft of the motor 51.

The motor 51 is a motor, such as a stepping motor, that can control the number of rotations. In the present embodiment, the motor 51 is shared for driving the carriage 110 and driving the plurality of pairs of conveyance rollers 153.

The first output mechanism 53 causes the plurality of pairs of conveyance rollers 153 to rotate in conjunction with the rotation of the motor gear 52. That is, the first output mechanism 53 transmits the rotation of the motor 51 to the plurality of pairs of conveyance rollers 153.

The first output mechanism 53 includes a first main body gear 531, a cover input gear 532, a plurality of cover output gears 533, a link member 534, and an elastic member 535. The elastic member 535 is an example of a first elastic member.

The first main body gear 531 is rotatably supported by the carriage 110. The first main body gear 531 meshes with the motor gear 52. Accordingly, the first main body gear 531 rotates in conjunction with the motor 51.

In a state where the cover 102 is located at the closing position and the carriage 110 is located at a position between the first position P1 and a predetermined relay region P4, the cover input gear 532 meshes with the first main body gear 531 (see FIG. 2, FIG. 3).

The relay region P4 is a region occupying a certain range between the first position P1 and the second position P2.

In a case where the cover input gear 532 does not rotate in a state where the cover 102 is located at the closing position and the carriage 110 is located at a position between the first position P1 and the predetermined relay region P4, a force that causes the carriage 110 to move along the moving path is applied from the cover input gear 532 to the first main body gear 531 as the motor 51 operates.

One of the plurality of cover output gears 533 is a first cover output gear 5331 that meshes with the cover input gear 532. The remaining ones of the plurality of cover output gears 533 is a plurality of second cover output gears 5332 that transmit the rotational force of the first cover output gear 5331 to the plurality of pairs of conveyance rollers 153.

The cover input gear 532 is provided in a displaceable manner in the cover 102. Specifically, the cover input gear 532 is provided in such a way as to be displaced in a direction to approach or separate from the first main body gear 531 in the state where the cover 102 is located at the closing position and the carriage 110 is located at a region extending from the first position P1 to the relay region P4.

In the present embodiment, the link member 534 is pivotably supported by the rotary shaft of the first cover output gear 5331, and the link member 534 rotatably supports the rotary shaft of the cover input gear 532.

The rotary shaft of the first cover output gear 5331 is supported at a constant position. Accordingly, the cover input gear 532 is configured to be displaced in a direction to approach or separate from the first main body gear 531 while maintaining a state of meshing with the first cover output gear 5331.

That is, the link member 534 supports the cover input gear 532 such that the cover input gear 532 can be displaced in the direction to approach or separate from the first main body gear 531 while maintaining the state of meshing with the first cover output gear 5331. The link member 534 is an example of a movable support member.

The elastic member 535 elastically biases the cover input gear 532 toward the first main body gear 531. For example, the elastic member 535 is a spring.

The elastic member 535 shown in FIG. 2 is a compression coil spring. The elastic member 535 may be another type of spring such as a torsion coil spring or a plate spring, or the elastic member 535 may be rubber.

As a result, even in a case where the first cover output gear 5331 does not mesh with the cover input gear 532 temporarily when the cover 102 is closed, the cover 102 does not float from the closing position, and the first cover output gear 5331 is retreated. Thereafter, when the first main body gear 531 starts rotating, the first cover output gear 5331 meshes with the cover input gear 532.

The plurality of cover output gears 533 cause the plurality of pairs of conveyance rollers 153 to rotate in conjunction with the cover input gear 532. That is, first cover output gear 5331 rotates following the cover input gear 532. Furthermore, the plurality of second cover output gears 5332 rotate following the first cover output gear 5331, thereby causing the plurality of pairs of conveyance rollers 153 to rotate.

The second output mechanism 54 causes the carriage 110 to move along the moving path in conjunction with the motor 51. That is, the second output mechanism 54 transmits, as the driving force, the rotational force of the motor 51 to the carriage 110.

In the present embodiment, the second output mechanism 54 includes a second main body gear 541 and a main rack gear 542.

The second main body gear 541 is rotatably supported by the carriage 110. The second main body gear 541 meshes with the first main body gear 531. As a result, the first main body gear 531 and the second main body gear 541 are supported by the carriage 110, and respectively rotate in conjunction with the motor 51.

The main rack gear 542 is disposed in the main body portion 101 in parallel to the moving path. That is, the main rack gear 542 is disposed along the sub scanning direction D2.

The main rack gear 542 is a rack gear that meshes with the second main body gear 541 in a state where the carriage 110 is located in a region that extends from the relay region P4 to the third position P3.

As a result, when the carriage 110 is located in the relay region P4, the first main body gear 531 and the cover input gear 532 mesh with each other, and the second main body gear 541 and the main rack gear 542 mesh with each other.

When the carriage 110 is located on the first position P1 side with respect to the relay region P4, the second main body gear 541 is separated from the main rack gear 542, and the first main body gear 531 meshes with the cover input gear 532.

That is, when the carriage 110 is located on the first position P1 side with respect to the relay region P4, the force is not applied from the main rack gear 542 to the second main body gear 541 even when the motor 51 operates.

It is noted that the first main body gear 531 and the cover input gear 532 mesh with each other on the condition that the cover 102 is located at the closing position.

In the following description, a state where the carriage 110 is located on the first position P1 side with respect to the relay region P4 is referred to as a first meshing state. The first meshing state is a state where the first main body gear 531 meshes with the cover input gear 532, but the second main body gear 541 does not mesh with the main rack gear 542.

In addition, a state where the carriage 110 is located on the third position P3 side with respect to the relay region P4 is referred to as a second meshing state. The second meshing state is a state where the second main body gear 541 meshes with the main rack gear 542, but the first main body gear 531 does not mesh with the cover input gear 532.

In addition, a state where the carriage 110 is located in the relay region P4 is referred to as a relay state. The relay state is a state where the first main body gear 531 meshes with the cover input gear 532, and the second main body gear 541 meshes with the main rack gear 542.

In the first meshing state, a load torque that is applied to the motor 51 to drive the cover input gear 532 when the carriage 110 is fixed, is larger than a load torque that is applied to the motor 51 to move the carriage 110 when the cover input gear 532 that meshes with the first main body gear 531, is fixed.

In other words, a torque that is required to drive the plurality of pairs of conveyance rollers 153 through the first output mechanism 53, is larger than a torque that is required to move the carriage 110 through the second output mechanism 54.

As a result, in the first meshing state, when the motor 51 rotates in a predetermined first rotation direction, the cover input gear 532 does not rotate, and the carriage 110 moves from the first position P1 side to the relay region P4 side by a force applied from the cover input gear 532.

In addition, in the first meshing state, when the motor 51 rotates in a second rotation direction opposite to the first rotation direction, the cover input gear 532 does not rotate, and the carriage 110 moves from the relay region P4 side to the first position P1 side by a force applied from the cover input gear 532.

The abutting member 55 is configured to abut on the carriage 110 that is moving from the second position P2 side to the first position P1 side, thereby stopping the carriage 110 at the first position P1. That is, when the motor 51 rotates in the second rotation direction, the abutting member 55 abuts on the carriage 110 and thereby restricts the carriage 110 from moving from the first position P1 in a direction opposite to the second position P2 with respect to the first position P1.

In the first meshing state, when the abutting member 55 abuts on the carriage 110 while the motor 51 is rotating in the second rotation direction, the carriage 110 stops at the first position P1. Furthermore, the cover input gear 532 and the plurality of cover output gears 533 rotate by a force received from the first main body gear 531.

As a result, in the first meshing state, when the motor 51 rotates in the second rotation direction in a state where the carriage 110 has reached the first position P1, the plurality of pairs of conveyance rollers 153 rotate in the forward rotation direction.

On the other hand, in the first meshing state, when the motor 51 rotates in the first rotation direction, the cover input gear 532 does not rotate. The carriage 110 thus moves from the first position P1 side to the relay region P4. This allows the state of the device to change from the first meshing state to the relay state.

In the relay state, when the motor 51 rotates in the first rotation direction, the carriage 110 moves in a direction of moving from the relay region P4 to the second position P2 by a force applied from the cover input gear 532 to the first main body gear 531 and a force applied from the main rack gear 542 to the second main body gear 541. This allows the state of the device to change from the relay state to the second meshing state.

In the second meshing state, when the motor 51 rotates in the first rotation direction, the carriage 110 moves in a direction toward the second position P2 and the third position P3 by a force applied from the main rack gear 542 to the second main body gear 541.

In the image reading device 1, the initial position of the carriage 110 is the second position P2. While causing the motor 51 to operate, the control device 8 identifies the position of the carriage 110 in real time by counting the number of rotations of the motor 51.

When positioning the carriage 110 to the initial position, the control device 8 starts the motor 51 and stops the motor 51 when the carriage 110 reaches the second position P2. The reaching of the carriage 110 to the second position P2 is detected by the carriage sensor 6.

When a start event of the image reading process of the flatbed method occurs after the carriage 110 is positioned to the second position P2, the control device 8 rotates the motor 51 in the first rotation direction. This allows the carriage 110 to move from the second position P2 toward the third position P3.

Furthermore, when the carriage 110 reaches the third position P3, the control device 8 rotates the motor 51 in the second rotation direction. This allows the movement direction of the carriage 110 to be reversed, and the carriage 110 moves from the third position P3 toward the second position P2.

Subsequently, when the carriage 110 reaches the second position P2, the control device 8 stops the motor 51.

In addition, when a start event of the image reading process of the document sheet feed method occurs after the carriage 110 is positioned to the second position P2, the control device 8 rotates the motor 51 in the second rotation direction. This allows the carriage 110 to move from the second position P2, pass through the relay region P4, and move toward the first position P1.

Subsequently, after the carriage 110 reaches the first position P1, the control device 8 continues to rotate the motor 51 in the second rotation direction. In this case, the carriage 110 stops upon abutting on the abutting member 55, and the first output mechanism 53 rotates the plurality of pairs of conveyance rollers 153 in the forward rotation direction.

As described above, with the adoption of the drive device 5, one motor 51 is shared for movement of the carriage 110 and for conveyance of the document sheet 9. In addition, by only adopting the first output mechanism 53 and the second output mechanism 54 each having a simple structure, it is possible to realize a mechanism for sharing the motor 51 without having another switching mechanism of a complex structure.

It is noted that when the cover 102 is opened in the first meshing state, the first main body gear 531 and the second main body gear 541 idly rotate even when the motor 51 operates. As a result, the carriage 110 does not move.

In a case where a cover sensor (not shown) has detected that the discharge tray 102 is not located at the closing position when it is necessary to move the carriage 110 in a region on the first position P1 side with respect to the relay region P4, the control device 8 executes a predetermined emergency process.

The emergency process includes a process for stopping the motor 51, and a process for displaying a predetermined cover closing message on the display device 8b. The cover closing message is a process for urging the user to close the cover 102.

Furthermore, when it is detected during the emergency process that the cover 102 is located at the closing position, the control device 8 restarts controlling the motor 51.

Second Embodiment

Figure 5:
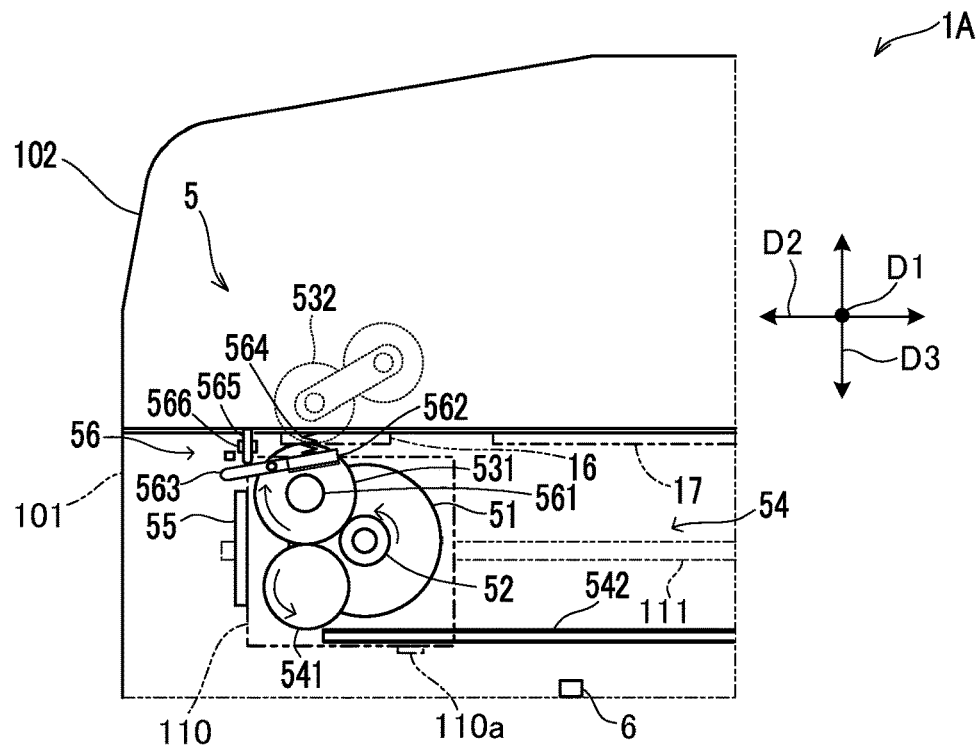
FIG. 5 is a front diagram of an auxiliary drive mechanism in a drive device of an image reading device according to a second embodiment (cover closed state).
Figure 6:
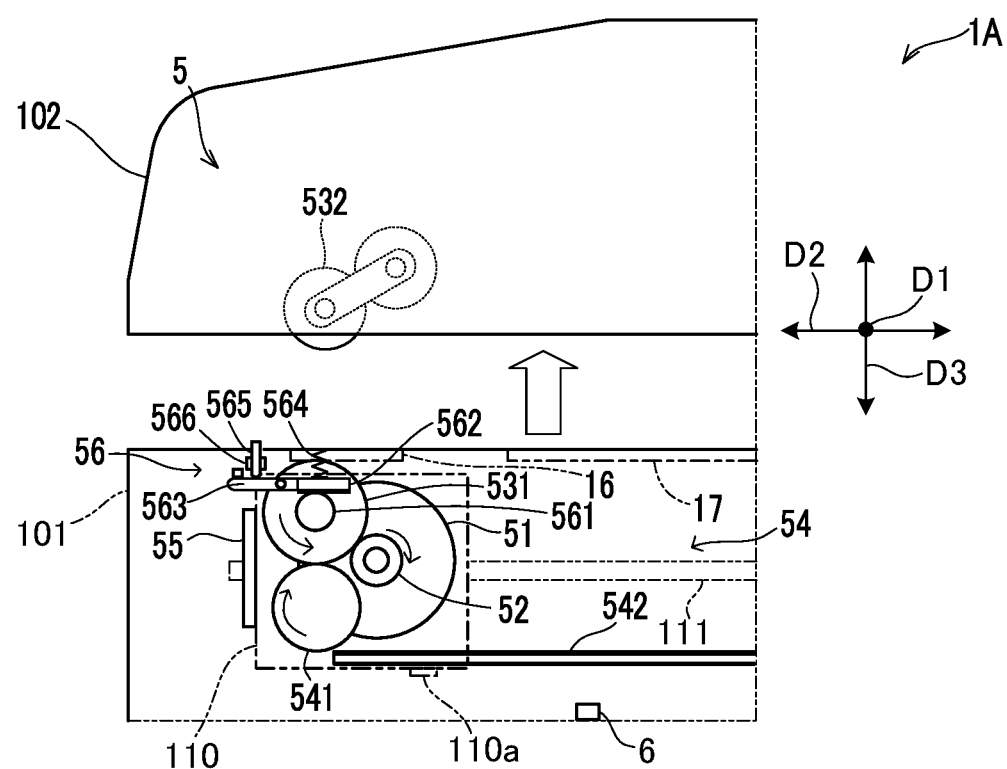
FIG. 6 is a front diagram of the auxiliary drive mechanism in the drive device of the image reading device according to the second embodiment (cover open state).

Next, the following describes an image reading device 1A according to a second embodiment with reference to FIG. 5 and FIG. 6. The image reading device 1A additionally includes an auxiliary drive mechanism 56 compared to the image reading device 1. The auxiliary drive mechanism 56 is a part of the drive device 5.

The auxiliary drive mechanism 56 is a mechanism for realizing movement of the carriage 110 in a region on the first position P1 side with respect to the relay region P4 even if the discharge tray 102 is not located at the closing position.

The auxiliary drive mechanism 56 includes a third main body gear 561, an auxiliary rack gear 562, a link member 563, an elastic member 564, an ascending/descending member 565, and an ascending/descending member guide 566. The components of the auxiliary drive mechanism 56 are provided in the main body portion 101.

The third main body gear 561 is integrally formed with the first main body gear 531. The third main body gear 561 is an example of a gear that rotates in conjunction with the first main body gear 531.

The auxiliary rack gear 562 is a rack gear supported in such a way as to be displaced between an engaging position and a retreat position. FIG. 5 shows an example of the auxiliary rack gear 562 located at the engaging position, and FIG. 6 shows an example of the auxiliary rack gear 562 located at the retreat position.

When located at the engaging position, the auxiliary rack gear 562 meshes with the third main body gear 561 in a state of being parallel to the moving path, when the carriage 110 is located in a region extending from the first position P1 to the relay region P4 (see FIG. 6).

On the other hand, when located at the retreat position, the auxiliary rack gear 562 is separated from the third main body gear 561 (see FIG. 5). That is, when located at the retreat position, the auxiliary rack gear 562 does not mesh with the third main body gear 561.

The elastic member 564 is an example of a second elastic member that elastically biases the auxiliary rack gear 562 toward the engaging position. For example, the elastic member 535 is a spring.

The elastic member 564 shown in FIG. 5 and FIG. 6 is a compression coil spring. The elastic member 564 may be another type of spring such as a torsion coil spring or a plate spring, or the elastic member 564 may be rubber.

The link member 563 supports the auxiliary rack gear 562 such that the auxiliary rack gear 562 is displaced between the engaging position and the retreat position. In the example shown in FIG. 5 and FIG. 6, the link member 563 is integrally formed with the auxiliary rack gear 562, and is rotatably supported. As the link member 563 rotates, the auxiliary rack gear 562 is displaced.

The ascending/descending member 565 is ascendably/descendably supported at a position projecting from the upper surface of the main body portion 101. The lower end of the ascending/descending member 565 is in contact with the link member 563.

The ascending/descending member guide 566 guides the ascending/descending member 565 along an up-down direction between a projection position projecting from the upper surface of the main body portion 101 and an upper surface position that is along the upper surface of the main body portion 101.

When the cover 102 is not located at the closing position, the auxiliary rack gear 562 is held at the engaging position by an elastic force of the elastic member 564.

When the motor 51 rotates in a state where the auxiliary rack gear 562 is held at the engaging position, the third main body gear 561 receives a force parallel to the moving path, from the auxiliary rack gear 562. This allows the carriage 110 to move in accordance with the operation of the motor 51 even when the carriage 110 is located in the region extending from the first position P1 to the relay region P4.

In addition, in a case where the carriage 110 is located in the relay region P4, and the cover 102 is not located at the closing position, the carriage 110 receives forces, in the same direction, from the main rack gear 542 meshing with the second main body gear 541 and the auxiliary rack gear 562 meshing with the third main body gear 561.

Accordingly, when the carriage 110 is located in the relay region P4, too, the carriage 110 moves in accordance with the operation of the motor 51. At this time, the auxiliary rack gear 562 meshing with the third main body gear 561 does not interfere with the movement of the carriage 110 caused by meshing of the second main body gear 541 and the main rack gear 542.

On the other hand, when the cover 102 is displaced to the closing position, the ascending/descending member 565 is lowered to the upper surface position by a pressure received from the cover 102.

When, upon receiving a load of the cover 102, the ascending/descending member 565 is displaced to the upper surface position, the lower end of the ascending/descending member 565 presses down the link member 563. This allows the auxiliary rack gear 562 to be displaced to the retreat position against an elastic force of the elastic member 564. This releases the meshing between the auxiliary rack gear 562 and the first main body gear 531.

As a result, when the cover 102 is located at the closing position, either the carriage 110 or the plurality of pairs of conveyance rollers 153 operate in accordance with the rotation direction of the motor 51 and the position of the carriage 110.

It is noted that the link member 563, the ascending/descending member 565, and the ascending/descending member guide 566 are an example of a link mechanism that, when the cover 102 is located at the closing position, displaces the auxiliary rack gear 562 to the retreat position against the elastic force of the elastic member 564 by a force that is received from the cover 102 when the link mechanism comes in contact with the cover 102.

In the image reading device 1A, due to the configuration where the drive device 5 includes the auxiliary drive mechanism 56, it is possible to move the carriage 110 in the region on the first position P1 side with respect to the relay region P4 even when the cover 102 is not located at the closing position.

[Application Examples]

In the drive device 5 of the image reading device 1A, the first main body gear 531 may also serve as the third main body gear 561 that rotates in conjunction with the first main body gear 531. In addition, the third main body gear 561 may be provided as a separate body from the first main body gear 531.

The invention claimed is:

1. An image reading device comprising:
   an image sensor;
   a contact glass;
   a platen glass disposed side by side with the contact glass;
   a carriage supporting a light emission portion that emits light upward, and a light guide member that guides a reflection light of the light emitted from the light emission portion to the image sensor, the carriage configured to, upon application of a driving force, move along a predetermined moving path that passes through a first position located below the contact glass, a second position located below a first end portion of the platen glass, and a third position located below a second end portion of the platen glass, the first end portion being close to the contact glass, the second end portion being opposite to the first end portion;
   a main body portion storing the carriage, wherein the contact glass and the platen glass are disposed on an upper surface of the main body portion;
   a cover supported in such a way as to be displaced between a closing position and an opening position, the closing position being located on the upper surface of the main body portion where the cover covers the contact glass and the platen glass, the opening position being more separated from the upper surface of the main body portion than the closing position;
   a plurality of pairs of conveyance rollers provided in the cover and configured to, upon application of a driving force, convey a document sheet along a conveyance path that passes through positions along an upper surface of the contact glass, in a state where the cover is located at the closing position; and
   a drive device configured to selectively apply a driving force to the carriage and the plurality of pairs of conveyance rollers, wherein the drive device includes:
   an abutting member provided in the main body portion and configured to abut on the carriage that is moving from the second position side to the first position side, thereby stopping the carriage at the first position;
   a motor supported by the carriage;
   a first main body gear and a second main body gear that are supported by the carriage, and respectively rotate in conjunction with the motor;
   a cover input gear provided in the cover and configured to mesh with the first main body gear in a state where the carriage is located at a position between the first position and a predetermined relay region that is located between the first position and the second position;
   a cover output gear configured to cause the plurality of pairs of conveyance rollers to rotate in conjunction with the cover input gear; and
   a main rack gear that is a rack gear disposed in the main body portion in parallel to the predetermined moving path, and configured to mesh with the second main body gear in a state where the carriage is located in a region extending from the predetermined relay region to the third position, wherein
in a state where the carriage is located at a position on the first position side with respect to the predetermined relay region, a load torque that is applied to the motor to drive the cover input gear when the carriage is fixed, is larger than a load torque that is applied to the motor to move the carriage when the cover input gear that meshes with the first main body gear, is fixed.

2. The image reading device according to claim 1, further comprising:
   a movable support member provided in the cover and supporting the cover input gear such that the cover input gear can be displaced in a direction to approach or separate from the first main body gear while maintaining a state of meshing with the cover output gear; and
   a first elastic member provided in the cover and configured to elastically bias the cover input gear toward the first main body gear.

3. The image reading device according to claim 1, further comprising:
   a third main body gear provided in the main body portion and configured to rotate in conjunction with the first main body gear;
   an auxiliary rack gear that is a rack gear provided in the main body portion and supported in such a way as to be displaced between an engaging position and a retreat position, wherein when located at the engaging position, the auxiliary rack gear meshes with the third main body gear in a state of being parallel to the predetermined moving path, when the carriage is located in a region extending from the first position to the predetermined relay region, and when located at the retreat position, the auxiliary rack gear is separated from the third main body gear;
   a second elastic member provided in the main body portion and configured to elastically bias the auxiliary rack gear toward the engaging position; and
   a link mechanism provided in the main body portion and configured to, when the cover is located at the closing position, displace the auxiliary rack gear to the retreat position against an elastic force of the second elastic member by a force that is received from the cover when the link mechanism comes in contact with the cover, wherein in a case where the carriage is located in the predetermined relay region, and the cover is not located at the closing position, the carriage receives forces, in a same direction, from the main rack gear meshing with the second main body gear and the auxiliary rack gear meshing with the third main body gear.

4. An image forming apparatus comprising:

the image reading device according to claim 1; and a print device configured to form, on a sheet, an image that is read from a document sheet by the image reading device.

\* \* \* \* \*

UNITED STATES PATENT AND TRADEMARK OFFICE
CERTIFICATE OF CORRECTION

| | |
|---|---|
| PATENT NO. | : 11,438,480 B2 |
| APPLICATION NO. | : 17/295838 |
| DATED | : September 6, 2022 |
| INVENTOR(S) | : Khac Thap Bui and Danh Hoang Nguyen |

It is certified that error appears in the above-identified patent and that said Letters Patent is hereby corrected as shown below:

On the Title Page

Item (54), Line 5, and in the Specification Column 1 Line 5, "PLUTALITY" should be changed to --PLURALITY--

Signed and Sealed this
Eighth Day of November, 2022

Katherine Kelly Vidal
*Director of the United States Patent and Trademark Office*